May 21, 1946.  E. E. TOEWS  2,400,667
CONVEYER BELT
Filed Sept. 19, 1944
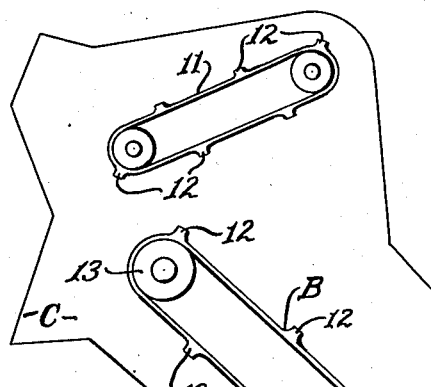
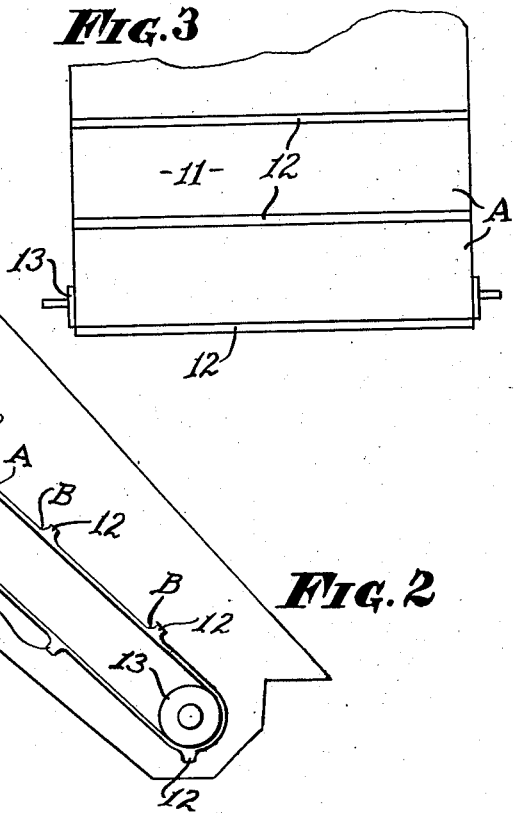
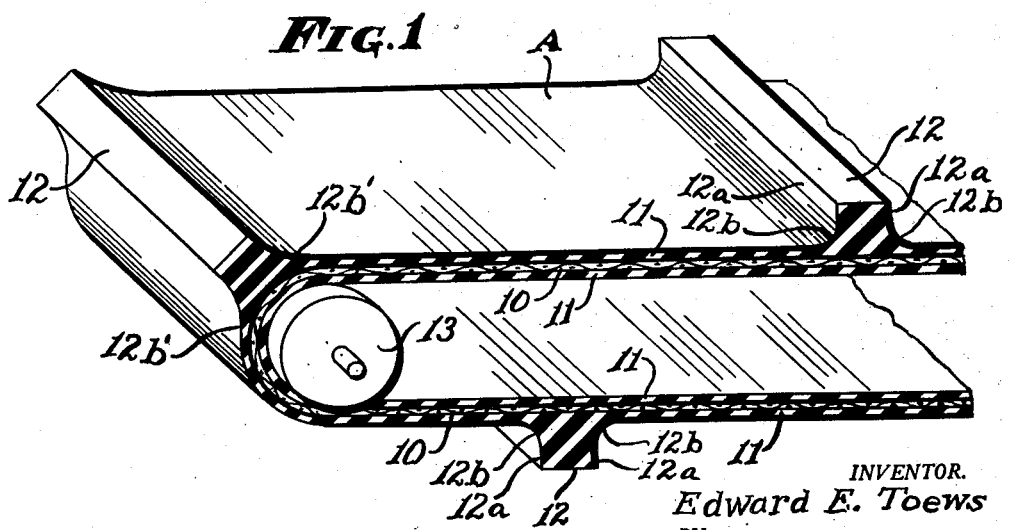
INVENTOR.
Edward E. Toews
BY
M. Y. Charles
ATTORNEY

UNITED STATES PATENT OFFICE 2,400,667

CONVEYER BELT

Edward E. Toews, Halstead, Kans., assignor to Rub-R-Slat Draper Co., Halstead, Kans.

Application September 19, 1944, Serial No. 554,744

1 Claim. (Cl. 198—199)

My invention relates to an improvement in conveyer belts, and is an improvement over my Patent No. 2,305,044, issued December 15, 1942.

This invention applies to conveyer belts particularly of the type used in combine harvesters and similar machines where small grain or matter is to be handled.

In the case of combine harvesters the belt will travel along the cutting platform and then travel in an upwardly inclined direction to discharge its load into the threshing cylinder to be threshed.

In the operation of cutting the grain laden straw and placing it on the platform conveyer belt some of the grain will fall from the head and land on the conveyer belt. If the grain happens to be a light weight grain such as flax seed, alfalfa seed, and the like, the belt must be of a smooth tight surface with comparatively high standing transverse ribs thereon that are integrally formed on the belt surface so no joinder cracks exist so that no seed can sift through the belt at any point, and as the belt travels up the incline, above mentioned, the ribs must be of sufficient height that they will form a series of transverse troughs on the belt that will catch the loose seed on the belt and carry the seed to and discharge it into the threshing chamber of the machine thereby saving the seed and avoiding loss from the seed sifting through the belt or being caught and broken in cracks between the belt and slats thereon. The belt is equally efficient in cutting and threshing some of the larger grain such as wheat, oats, barley, rye and the like.

In view of the foregoing explanation, one of the objects of this invention is to provide a fabric, rubber covered belt having comparatively high standing rubber ribs integrally formed thereon.

Another object is to provide a belt of the kind mentioned in which the sides of the ribs are approximately straight and parallel with each other and a large fillet is provided the extremities of which extend well up on the sides of the rib and well out on the surface of the belt so that when the belt is rolled over comparatively small rollers the bottom portion of the rib will bend around the curve of the roller and not crack or break the rib from the belt. This combination provides longer life for the belt and also causes the belt to run much smoother on the machine.

Another object is to provide a belt of the kind mentioned that is easy to make and therefore the belt can be made at a reduced cost and can be retailed at a reduced price. These and other objects will be more fully explained as this description progresses.

Now referring to the accompanying drawing;

Fig. 1 is an enlarged detail sectional and perspective view of the belt.

Fig. 2 is a side view of a portion of a cutter platform and inclined portion associated therewith, and showing the belt and upper feed belt as employed in a machine such as a combine harvester.

Fig. 3 is a plan view of a belt such as shown in Figures 1 and 2.

Similar numerals of reference designate the same parts throughout the several figures of the drawing.

In the drawing is shown my improved conveyer belt as having a fabric body 10 that is provided with a rubber coating 11 on either side and the edges thereof. The cover on the outside of the belt is provided with rubber ribs 12 that are integrally formed as a part of the rubber covering 11.

The upper side portions 12a of the ribs 12 are straight and are in parallelism with each other. Approximately half way down on each side of the ribs 12 the formation of the rib begins to swing outwardly and downwardly to die out into the rubber cover 11 to form a large fillet 12b at the base of each rib. These fillets 12b form a broad base for the ribs 12 which, as the rib rolls around a roller 13, the outer edges of the fillet 12b will bend to conform to the curve of the roller as at 12b' so that the rib 12 will not break from the belt; also the belt will roll smoothly around the roller and avoid the bumpety-bump action of the conventional ribbed belt commonly used.

This smoothness of action of the belt avoids light grain or seed from being bounced from the belt as the belt runs and being lost.

The ribs 12 also have another characteristic; as they travel up the incline A they form large smooth round bottomed transverse troughs B in which the loose grain or seed on the belt will be smoothly carried to the top of the incline A and dumped into the threshing cavity C of the machine, thus the seed is caught and loss of the grain or seed is avoided.

Such modifications of my invention may be employed as lie within the scope of the appended claim without departing from the spirit and intention of the invention. Now having fully shown and described my invention, what I claim is:

In a conveyer belt of the kind described; said belt having in combination a fabric base covered by a rubber covering on which is integrally formed transversely positioned solid rubber ribs on one side of the belt, said ribs having a broad flat top and being of sufficient height to form deep trough like portions between the sides of the ribs and the adjacent surface of the belt, said ribs having sides that are substantially parallel to each other, and filled corners between the ribs and the adjacent surface of the belt to form round bottoms for the said trough and to provide a broad flexible base portion of the ribs, said filled corners being integral with and extending substantially midway up the depth of the ribs as shown and for the purpose described.

EDWARD E. TOEWS.